Dec. 1, 1925.  
C. E. PAGE  
WEIGHING SCALE  
Filed May 17, 1923  
1,563,781  
2 Sheets-Sheet 1

INVENTOR  
C. E. Page  
BY  
ATTORNEY

Dec. 1, 1925.

C. E. PAGE 1,563,781

WEIGHING SCALE

Filed May 17, 1923   2 Sheets-Sheet 2

INVENTOR
C. E. Page
By Howard P. Denison
ATTORNEY

Patented Dec. 1, 1925.

1,563,781

UNITED STATES PATENT OFFICE.

CHARLES E. PAGE, OF BALDWINSVILLE, NEW YORK.

WEIGHING SCALE.

Application filed May 17, 1923. Serial No. 639,673.

*To all whom it may concern:*

Be it known that I, CHARLES E. PAGE, a citizen of the United States of America, of Baldwinsville, in the county of Onondaga, in the State of New York, have invented new and useful Improvements in Weighing Scales, of which the following, taken in connection with the accompanying drawings, is a full, clear, and exact description.

This invention relates to a coin-controlled weighing scale of the "dial and pointer" type in which the pointer is moved clockwise from its zero position around the dial by coin-controlled means acting independently of the mechanism which is actuated by the usual weight-receiving platform and involves the use of a suitable stop, actuated clockwise by said mechanism when weight is applied to the platform to limit the movement of the pointer actuating device and to restore the latter to its zero position through the action of suitable retracting means when the weight is removed.

Owing to the fact that these machines are adapted for self-service to be used by the general public, they are frequently subjected to rough and careless usage without any special restraint by the owner or lessee, and many of the machines now in common use require frequent adjustments and repairs in order to keep them in working order sufficient to meet the requirements of the local sealers of weights and measures, and one of the main objects of my present invention is to not only simplify the construction and thereby to reduce its cost of manufacture, but also to increase its working efficiency and durability and thereby to materially reduce the liability of impairment.

Other objects and uses relating to specific parts of the machine will be brought out in the following description.

Figure 1:
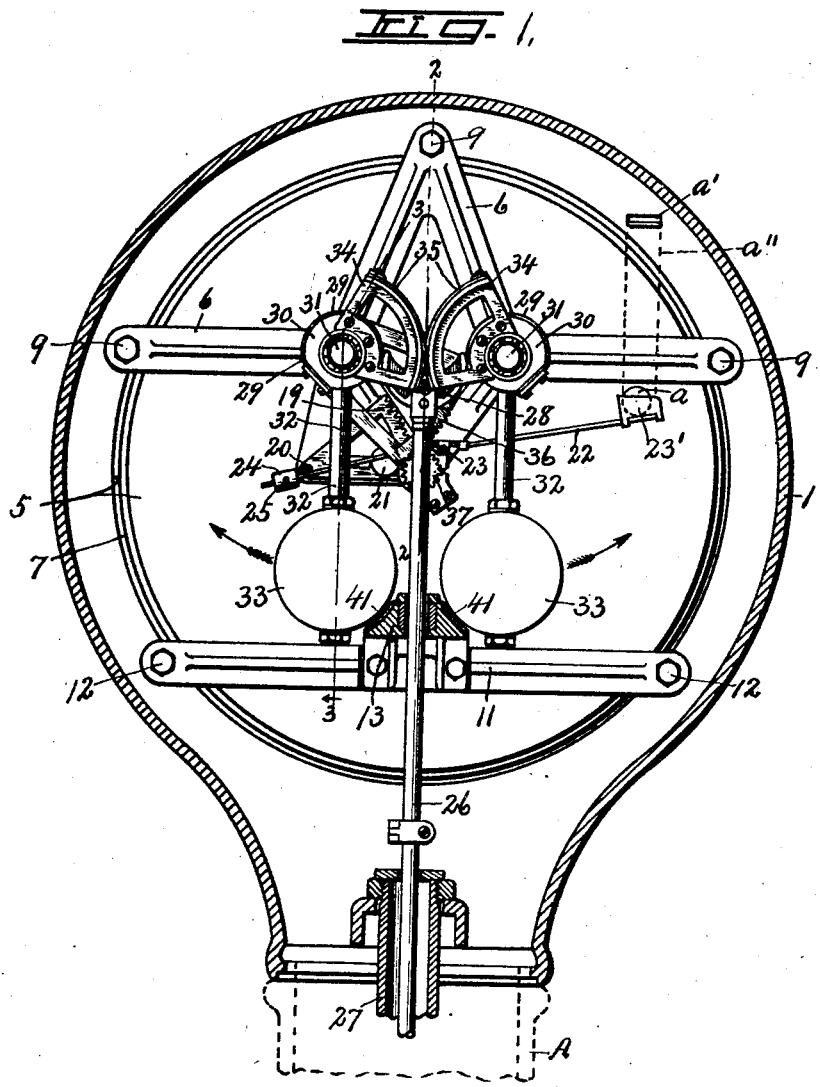

In the drawings, Figure 1 is a rear elevation, partly in section, of the upper portion of a coin-controlled weighing scales embodying the various features of my invention, the parts being in their normal position of rest.

Figure 2:
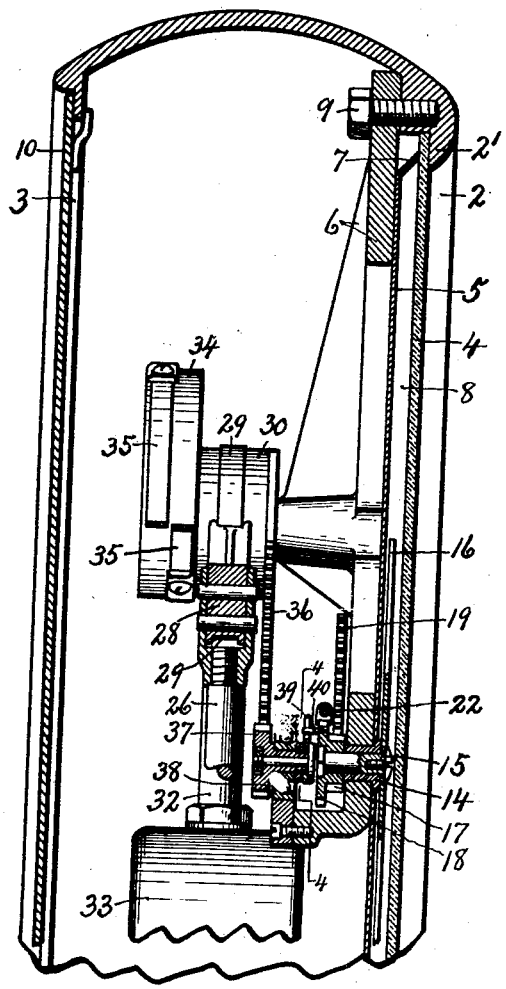
Figure 3:
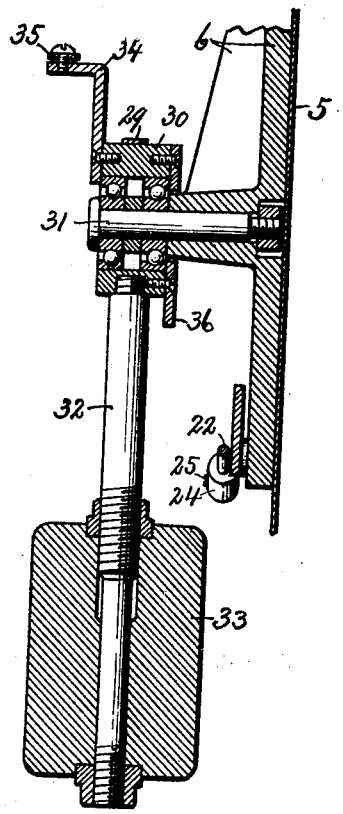

Figures 2 and 3 are enlarged transverse vertical sectional views taken respectively on line 2—2 and 3—3, Figure 1.

Figure 4:
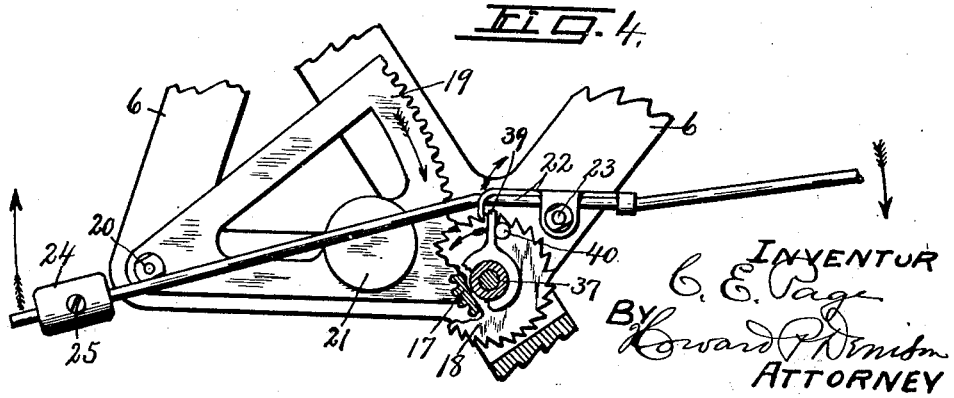

Figure 4 is a further enlarged sectional view taken in the plane of line 4—4, Figure 2, portions of the ratchet wheel being broken away to show the adjacent pinion.

As illustrated, this machine comprises a hollow frame or casing —1—, the upper portion of which is substantially circular in front elevation and its lower portion reduced for receiving a supporting column —A— indicated by dotted lines in Figure 1, said supporting column being mounted upon any suitable base capable of receiving and supporting any of the standard forms of platforms and lever systems therefor.

The upper portion of the case —1— is provided with relatively large circular openings —2— and —3— in the front and rear walls thereof, the front opening being surrounded by a marginal flange —2'— against which is seated the marginal edge of a glass cover plate —4— held in place by a circular dial —5— and an internal bracket —6—.

That is, the marginal edge of the transparent plate —4— is seated against the inner face of the flange —2'—, while the dial plate —5— is provided with an outturned marginal flange —7— bearing against the inner face of the marginal edge of the plate —4— within the flange —2'— for holding said plate —4— in operative position and also holding the main body of the dial plate in spaced relation to the transparent outer plate to form an intervening chamber —8— in which the pointer, presently described, is movable.

The bracket —6— is secured by bolts —9— to the inner face of the marginal flange —2'— so as to rest against the inner face of the dial plate —5— and thereby to stiffen the dial plate and hold its marginal edge against the corresponding marginal edge of the glass plate —4—.

This bracket —6— extends from the top and from the opposite sides of the case downwardly across the axis or center of the circular openings —2— and —3— for receiving and supporting various movable parts of the interior mechanisms, hereinafter described.

The rear opening —3— may be closed by a suitable plate —10— capable of being removed to permit access to the interior parts when desired.

An additional cross bar or bracket —11— is secured by bolts —12— to the inner face of the marginal flange —2'— for receiving and supporting a buffer block —13— which also forms a guide for the vertically movable rod by which motion is transmitted from the platform levers to the registering mechanism in the upper portion of the case.

The bracket —6— is provided with a journal bearing —14— coaxial with the opening —2— and dial plate —5— for receiving and supporting a rotary spindle —15— carrying at its outer end, a pointer —16— which is movable in the chamber —8— around the front face of the dial, the latter being graduated in the usual manner, from a central zero position at the top to indicate various weights according to the position of the pointer.

The inner end of the spindle —15— carries a pinion —17— and a ratchet wheel —18— secured rigidly to each other to rotate in unison with the spindle —15—.

A toothed segment —19—, Figure 4, is pivoted at —20— to the bracket —6— some distance to one side of the axis of the spindle —15— to rock vertically about an axis parallel with that of the spindle and is adapted to engage the teeth of the pinion —17— for imparting motion thereto, said toothed segment being weighted at —21— to form a motor for rocking the toothed edge of the segment —19— downwardly about its axis and thereby imparting a clockwise motion to the pointer —16— through the medium of the spindle —15—.

A pawl —22— is pivoted at —23— to the bracket —6— for engaging the teeth of the ratchet wheel —18— and thereby holding the spindle —15— and its pointer —16— against rotation by the weighted rack —19— until the pawl is tripped.

As shown more clearly in Figure 4, the pawl —22— is movable about an axis parallel with that of the spindle —15— and toothed segment —19— and extends some distance in opposite directions from its pivot, one end being provided with a coin-receiver —23'— while the other end is weighted at —24— to normally hold the coin-receiver —23'— in an elevated position for receiving a coin as —a—, Figure 1, which is adapted to be inserted by the user into a slot —a'— in the front wall or flange —2'— of the case —1—.

Any suitable means may be employed for conducting the coin from the slot —a'— into the coin-receiver —23'—, said means being indicated by dotted lines at —a''—, Figure 1, but may be of any form commonly used in machines of this character.

The weight —24— is adjustable along the adjacent end of the pawl —22— and is held in its adjusted position by a set screw —25—. The weighted end of the lever and the coin receiving end are set or adjusted to permit the coin receiver to be depressed against the action of the weighted end by the entrance of the coin therein, and thereby to disengage the pawl from the ratchet wheel —18— and permit the spindle —15— with the pointer —16— thereon to be rotated clockwise from its normal position of rest through the medium of the weighted segment —19— and pinion —17—.

An upright rod or bar —26— is movable endwise vertically within the case —1— and column —A— through a suitable guide tube —27— and has its lower end connected in any well known manner to the usual platform-supporting levers whereby the weight upon the platform will cause a downward movement of the rod, the upper end of said rod being guided in the bearing —13— on the cross bar —11— and carries at its upper end a head —28— having a semi-circular lower bearing face which is seated upon the intermediate portion of a flexible tape or band —29— of steel having its ends rigidly secured to a pair of circular drums —30— at opposite sides of the rod —26—.

That is, these drums are journaled for rotary movement upon suitable supporting studs —31— preferably through the medium of ball bearings and are provided with pendant arms —32— having weights —33— adjustable lengthwise on the lower ends thereof.

The studs —31— are arranged in horizontally spaced relation equal distances from and at opposite sides of the head —28— of the rod —26— so that their weighted arms —32— normally hang in substantially parallel vertical planes, and constitute the means for returning the rod —26— to its normal elevated position when the weight upon the platform is removed.

That is, the lower curved face of the head —28— rests upon and is supported by the intermediate sagging portion of the steel tape —29— between the drums —30—, and it therefore, follows that any downward movement of the rod —26— by the weight upon the platform not shown, will impart a corresponding rocking movement to the drums —30— and weighted arms —32— in the direction indicated by the arrow, Figure 1.

The arcs of movement of the weighted arms —32— and drums —30— are proportionate to the weight upon the platform.

The drums —30— are provided at corresponding ends with similar segments —34— having curved peripheral bearings facing each other for receiving and supporting a pair of metal tapes or bands —35— each of which is secured to the upper end of one of the segments and has its lower end secured to the lower end of the other segment, said bands being arranged side by side to move in different planes so as not to interfere one with the other and serve to transmit motion from one drum to the other for maintaining equal movement between the weighted arms —32— and thereby to assure accuracy of measurement of the weight upon the platform in case the instrument as a whole, should be slightly out of plumb.

A toothed gear segment —36— is rigidly secured to the front end face of one of the drums —30— concentric with the axis thereof for intermeshing engagement with a pinion —37— which is journaled in a suitable bearing —38— on the lower end of the bracket —6— coaxial with the pinion —17— and ratchet wheel —18— previously described, but independently thereof.

The hub of the pinion —37— extends through and some distance beyond the bearing —38— and is provided with a radially projecting pin —39— adapted to engage and to be engaged by a cooperative pin —40— projecting axially from and upon the ratchet wheel —18— as shown in Figures 2 and 4.

That is, the pin —39— is rigidly secured to the hub of the pinion —37— to rotate therewith while the pin —40— is rigidly secured to the ratchet wheel —18— to rotate with said ratchet wheel and pinion —17— when the latter are actuated by the weighted segment —19—.

When the machine is at rest or without any weight upon the platform, the weighted arms —32— will automatically assume substantially vertical parallel positions at which time, the lower ends of the segments —19— and —36— will be in engagement with their respective pinions —17— and —37— under which conditions, the pin —40— on the ratchet wheel —18— will be held against the pin —39— by the action of the weighted segment —19— on the pinion —17—, it being understood that the pin —39— is normally held in a definite position by the weighted arms —33—, through the medium of the drums —30—, toothed segment —36— and pinion —37—, and therefore, constitutes a stop for limiting the rotary movement of the ratchet wheel —18— and pin —17— by the weighted segment —19— when the pawl —22— is tripped by the coin as —a—.

When the parts just described are in their normal positions, the pointer —16— which is mounted upon the spindle —15— of the ratchet wheel and pinion —17— will be set to a zero position indicated on the dial —5—, the latter being calibrated or graduated to correspond to the movements of the weighted arms —32— from their normal positions according to the weight transmitted from the platform to the rod —26— and if no coin is present in the receiver 23′ on the lever —22—, the pawl on said lever will be in holding engagement with the ratchet wheel —18—.

*Operation.*

Assume that the various movable parts are in their normal position of rest, and that weight is applied to the platform, thereby drawing the rod —26— downwardly and causing a corresponding outward swinging movement of the weighted arms —32— through the medium of the head —28—, band —29— and drums —30—, and also causing a corresponding movement of the toothed rack —36— which in turn will rotate the pinion —37— and stop pin —39—, clockwise independently of the pinion —17— and pointer —16—.

During this rotary movement of the stop pin —39—, the pointer —16— will be held at a zero position against rotary movement around the dial by the engagement of the pawl —22— with the ratchet-wheel —18— until a coin, as —a—, is dropped into the receiver —23— whereupon the receiver end of the pawl will be depressed against the action of the counter weight —25— to trip said pawl and thereby permit the weighted segment —19— to swing downwardly under its own weight for rotating the pinion —17— and pointer —16— clockwise until the pin —40— engages the previously shifted stop pin —39—, thus bringing the pointer to a position of rest to indicate upon the dial, the weight upon the platform.

When the weight is removed from the platform, the rod —26— and parts operated thereby will be restored to their normal positions by the dropping of the weighted arms —32— to their vertical positions, thereby rotating the pin —39— counter-clockwise against the pin —40— to impart similar counter-clockwise movement of the ratchet wheel —18—, pinion —17— and pointer —16— until the pointer is restored to its zero position, it being understood that when the receiver end of the pawl —22— is depressed by the coin —a—, the latter will be automatically discharged therefrom and allow the weight —25— to restore the pawl into engagement with the ratchet wheel —18— and to ride along the teeth of the ratchet wheel as the latter is rotated counter-clockwise by the return movement of the pin —39—.

The return movement of the weighted arms —32— is limited by the engagement of the weights —33— with suitable buffers —41—, Figure 1, which also limits return movement of the stop pin —39— and causes the pointer to stop in its return movement at the zero point on the dial.

The construction described is particularly simple, sturdy and reliable in that it avoids the use of springs and permits the pointer and its actuating mechanism to remain at rest while the platform and parts actuated thereby are being moved by the weight upon the platform, thereby preventing transmissions of vibration of the platform to the pointer and incidentally, preventing the vibration of the pointer until the stop pin —39— reaches the maximum arc of movement for a given weight at which time, the coin may be inserted into the receiver —23— to trip the pawl —22— and allow the weighted segment —19— to automatically rotate the pointer until limited by the engagement of the pin —40— with the stop pin —39— which latter therefore, performs the double function of a limiting stop and also a restoring means for the pointer.

What I claim is:

1. In a weighing scale of the character described, a pair of segmental bearings movable about parallel horizontal axes, a pair of bands each having one end connected to one segmental bearing and its other end connected to the other segmental bearing to cause said bearings to move in unison, means actuated by the object to be weighed for moving said bearings about their axes, additional means for returning the bearings to their starting positions; a stop actuated by the first-named means, and the coin controlled weight operated means cooperating with said stop for indicating the weight of the object being weighed.

2. In a weighing scale of the platform type, a pair of drums having pendant weighted arms, means actuated by the platform of the scales when weight is applied thereto for rotating the drums against the action of their weights, a weight registering device including a rotary member, a detent normally holding said member against rotation, coin-actuated means for tripping the detent, means for rotating said member when the detent is tripped, means including a rotary stop for limiting the movement of said rotary member, and means actuated by one of said drums for rotating said stop to different positions corresponding to the weight applied to the platform.

3. In a weighing scale of the platform type, a pair of rotary drums, a flexible tape attached to the periphery of said drums, a vertically movable rod supported by said tape and adapted to be actuated by weight applied to the platform for rotating the drums, a pair of segmental bearings mounted on the drums to rotate therewith, a pair of bands each having one end connected to one segment and its other end connected to the other segment to cause said segments and drums to move in unison, weighted arms secured to the drums and adapted to be operated against their own weight when the rod is moved downwardly by the weight on the platform, a toothed segment secured to one of the drums, a pinion actuated by said segment, and provided with a radial stop, a weight registering mechanism including a pinion coaxial with the first named pinion, means including a detent for holding the pinion against rotation, coin-actuated means for tripping the detent, a weighted gear segment meshing with the second named pinion for rotating the same when the detent is tripped, and a stop on the second named pinion coacting with the first named stop for limiting the movement of the registering device according to the weight applied to the platform.

In witness whereof I have hereunto set my hand this 5th day of May, 1923.

CHARLES E. PAGE.